US012584275B2

(12) United States Patent
Kaplanov

(10) Patent No.: US 12,584,275 B2
(45) Date of Patent: Mar. 24, 2026

(54) HEATED SURFACE FOR MELTING SNOW AND ICE

(71) Applicant: 33 DEGREES LLC, Grosse Point, MI (US)

(72) Inventor: Andreos Jeffrey Kaplanov, Sunnyvale, CA (US)

(73) Assignee: 33 DEGREES LLC, Grosse Point, MI (US)

(*) Notice: Subject to any disclaimer, the term of this patent is extended or adjusted under 35 U.S.C. 154(b) by 1025 days.

(21) Appl. No.: 17/657,779

(22) Filed: Apr. 4, 2022

(65) Prior Publication Data

US 2022/0316148 A1 Oct. 6, 2022

Related U.S. Application Data

(60) Provisional application No. 63/170,548, filed on Apr. 4, 2021, provisional application No. 63/170,549, filed (Continued)

(51) Int. Cl.

*E01C 11/26* (2006.01)
*H05B 3/14* (2006.01)
*H05B 3/28* (2006.01)

(52) U.S. Cl.

CPC .............. *E01C 11/265* (2013.01); *H05B 3/14* (2013.01); *H05B 3/28* (2013.01); *H05B 2214/02* (2013.01)

(58) Field of Classification Search

CPC ..... E01C 5/12; E01C 5/18; E01C 5/20; E01C 5/22; E01C 5/223; E01C 5/226; E01C 13/045; E01C 9/00; E01C 11/265
See application file for complete search history.

(56) References Cited

U.S. PATENT DOCUMENTS 5,614,292 A * 3/1997 Saylor ...................... H05B 3/36 428/209
6,294,768 B1 * 9/2001 Liebich .................... H05B 3/36 219/217
(Continued)

FOREIGN PATENT DOCUMENTS

CN 104534542 B 2/2018
CN 110778061 A 2/2020
(Continued)

*Primary Examiner* — Abigail A Risic
(74) *Attorney, Agent, or Firm* — McKee, Voorhees & Sease, PLC

(57) ABSTRACT

Heated surfaces for melting snow and ice are described herein. Some implementations include a highly integrated panel having upper and lower main structures secured to one another by an attachment through openings. Multiple panels can be connected together by means of load transfer devices on the upper and lower main structures. Other implementations include a melting panel with individual tiles, adhesives, structural materials, resistance-heating materials, electrically conductive materials, and thermally conductive materials. Power to the panels in the form of electricity may be provided via electrical wires and connectors, and further transmitted between the various parts of the panels. Still other implementations include embedded heating elements with adhesives, structural materials, resistance-heating materials, electrically conductive materials, and thermally conductive materials.

19 Claims, 11 Drawing Sheets

Related U.S. Application Data on Apr. 4, 2021, provisional application No. 63/170,547, filed on Apr. 4, 2021.

(56) References Cited

U.S. PATENT DOCUMENTS

| | | | | |
|---|---|---|---|---|
| 6,943,320 | B1 * | 9/2005 | Bavett | H05B 3/34 219/548 |
| 7,230,213 | B2 * | 6/2007 | Naylor | H05B 3/34 219/539 |
| 8,759,719 | B2 | 6/2014 | Feng et al. | |
| 10,378,778 | B2 * | 8/2019 | Forsbom | F24D 13/02 |
| 10,718,091 | B1 * | 7/2020 | Wesley | E01C 17/00 |
| 11,993,905 | B2 * | 5/2024 | Jones, Sr. | H05B 3/20 |
| 2016/0355997 | A1 * | 12/2016 | Lewley | H05B 3/56 |
| 2018/0335218 | A1 * | 11/2018 | Ray | H05B 3/34 |
| 2019/0090313 | A1 * | 3/2019 | Jones, Sr. | H05B 3/22 |
| 2020/0173665 | A1 | 6/2020 | Nyström et al. | |

FOREIGN PATENT DOCUMENTS

| | | | |
|---|---|---|---|
| CN | 210688430 | U | 6/2020 |
| CN | 111412516 | A | 7/2020 |
| CN | 109405040 | B | 12/2020 |
| CN | 213019844 | U | 4/2021 |
| CN | 213572739 | U | 6/2021 |
| DE | 19923937 | A1 | 12/1999 |
| KR | 19990036984 | U | 10/1999 |
| KR | 101578607 | B1 | 11/2015 |
| KR | 101979595 | B1 | 5/2019 |
| KR | 102088418 | B1 | 3/2020 |
| KR | 20200077702 | A | 7/2020 |
| WO | 2015125093 | A1 | 8/2015 |

* cited by examiner

HEATED SURFACE FOR MELTING SNOW AND ICE

CROSS REFERENCE TO RELATED APPLICATIONS

This application claims priority under 35 U.S.C. § 119 to provisional patent application U.S. Ser. No. 63/170,547, filed Apr. 4, 2021, U.S. Ser. No. 63/170,548, filed Apr. 4, 2021, and U.S. Ser. No. 63/170,549, filed Apr. 4, 2021. The provisional patent applications are herein incorporated by reference in their entireties, including without limitation, the specification, claims, and abstract, as well as any figures, tables, appendices, or drawings thereof.

FIELD OF THE INVENTION

The present invention relates generally to heated surfaces for melting snow and ice. Said heated surfaces have applications in at least the residential, commercial, and infrastructural industrials. More particularly, but not exclusively, the present disclosure relates to modular heated melting surfaces, heated tiles, embedded heating solutions, integrated panels, and/or multipurpose heating panels specifically optimized to melt snow and/or ice.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Many people have driveways, walkways, parking lots and/or other areas where access and use can be impaired by snowfall or freezing water. Most current solutions require considerable time and effort to resolve or minimize this impairment, and thus there exists a need in the art for providing solutions that address entire areas of concern all at once, with minimal effort, and with a more agreeable time investment.

Furthermore, many roads and runways require plowing or chemicals to address wintery conditions. This approach may be challenging to maintain ideal conditions at all times.

Many utility providers and governments require electricity to be distributed from generation to consumers. Using above ground wires mounted on poles may lead to weather related outages and unreliability.

Many governments and municipalities build roads and highways tallow for transportation of goods and people. Constructing new roads onsite may take considerable time and effort, and thus there exists a need in the art for providing solutions that can address one or more of these issues.

Some implementations described herein were conceived in light of the above mentioned problems, among other things.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to connect electrical heating elements thermally.

It is still yet a further object, feature, and/or advantage of the present invention to facilitate public and private transportation in areas with substantial winter seasons.

It is still yet a further object, feature, and/or advantage of the present invention to retrofit heating surfaces via embedded heating elements and assembly processes.

The heated surfaces for melting snow and ice disclosed herein can be used in a wide variety of applications. For example, some implementations can include modular heated melting surfaces, heated tiles, embedded heating solutions, integrated panels, and/or multipurpose heating panels specifically optimized to melt snow and/or ice.

It is preferred the heated surfaces for melting snow and ice disclosed herein promote safety, are cost effective, and remain durable over time. For example, the heated surfaces for melting snow and ice disclosed herein can be substantially weatherproof. In some embodiments, the heated surfaces for melting snow and ice disclose herein are adapted to resist excess static buildup, corrosion, and/or mechanical failures caused by prolonged exposure to stress or strain and/or forceful impacts (e.g. failure due to cracking, crumbling, shearing, creeping, excess tensile and/or compressive forces, etc.).

Methods can be practiced which facilitate use, manufacture, assembly, maintenance, and repair of the heated surfaces for melting snow and ice described herein which accomplish some or all of the previously stated objectives.

According to some other aspects of the present disclosure, a melting panel can include individual tiles, adhesives, structural materials, resistance-heating materials, electricity conductive materials, and thermal-conductive materials. An assembly of melting panels can form by connecting the melting panels to one another by way of the electrical and mechanical connectors.

The assembly can be regulated by a control module, sensors (e.g., thermal sensors), and software. Programming, via software, the control module to apply heat based upon a daily timer can be beneficial. For example, the control module can instruct heating elements in the melting panel to “charge” the concrete floor with heat during night hours. If the floor’s thermal mass is large enough, the heat stored in the concrete can keep the floor comfortable for the day hours without significant further electrical input, especially where temperatures during the day are significantly warmer than temperatures at night. The use of thermal sensors can also help determine to what extent further electrical input is needed, if any. The heating of radiant floors at night combined with the use of a minimal amount of on-demand heat needed during the day can help save a considerable amount of money because electric companies charge peak rates during the day.

Efficiency can be improved in radiant floor heating if located at the bottom of occupied air volume with a lack of ducts. Placement of radiant floors onto a significant thermal mass such as a thick concrete floor can help improve comfort.

According to some additional aspects of the present disclosure, the melting panel is joined together with like panels to cover a larger surface. Electrical circuits of like panels can be connected together. Mechanical attachments can not only secure the panels to one another, but can also affix to other surfaces to enhance stability. In some embodiments the mechanical attachments comprise electromechanical connections.

According to some other aspects of the present disclosure, a method of assembling a melting panel comprises: enclosing a heating element within a thermally conductive film/mesh material; electrically connecting a wire to the thermally conductive film or the mesh material; adhering tiles to the film or the mesh material; affixing a grounding element to the mesh or the film material; affixing one or more structural elements to the adhesive; at least partially encasing a plurality of heated tiles between the one or more structural elements; affixing a mechanical connector to an edge of the melting panel; and affixing an electromechanical connector to said edge or another edge of the melting panel, wherein the electromechanical connector is electrically connected to the electrical wire.

According to some additional aspects of the present disclosure, the method can further comprise applying an adhesive or structural material is applied for the lower surface and/or removing any excess or unwanted material.

According to some other aspects of the present disclosure, a method of assembling several melting panels together comprises: providing a melting panel as mentioned in the preceding paragraph; placing a first melting panel at the desired location; attaching a second melting panel to the first melting panel with the mechanical connectors and/or electromechanical connectors; and securing one or more of the panels to an external surface or object. The aforementioned steps can be repeated until a desired surface area for melting is reached.

According to some other aspects of the present disclosure, an embedded heating solution comprises a slab with grooves, channels, and/or reliefs that enable placement of a plurality of heating elements. An insulating material fills remaining space not taken up by the plurality of heating elements within said grooves, channels, and/or reliefs. A thermally conductive material is thinly layered over the slab and the insulating material and has an upper, planar surface. A structural element's lower surface approximates the upper planar surface of the thermally conductive material. The structural element includes an exposed surface with aesthetic marks and/or shapes to differentiate a look of the exposed surface from the lower surface of the structural element. An electrical connector is electrically connected to said plurality of heating elements.

According to some other aspects of the present disclosure, a method of installing the embedded heating system described in the preceding paragraph can comprise any one or more of the following steps: removing material from the slab to form the grooves, channels, and/or reliefs; applying the insulating material to an upper surface of the slab; placing heating elements in the grooves, channels, and/or reliefs; applying the thermally conductive material to the upper surface of the slab; laying a durable, structural layer on top of the upper surface of the slab and the thermally conductive material; forming the durable, structural layer to a prescribed design; and affixing the electrical connector such that an electrical connection is established among the plurality of heating elements and external power source. The method can be, but is not limited to being, executed by accomplishes the steps of this paragraph in order.

According to some other aspects of the present disclosure, a highly integrated panel, or multipurpose module comprises upper and lower main structures (panels). Multiple panels can be connected together with load transfer devices on the lower panel and on the upper panel. A provision within the highly integrated panel allows cables and other utilities to pass through openings. Water drainage channels can be included. The upper panel may be secured to the lower panel by an attachment means through openings. Power in the form of electricity can be provided via the wires passing through, transmitted, and further transmitted through a variable-distance contact and associated receptor.

According to some additional aspects of the present disclosure, an electric heating element generates heat which can be used to melt snow and ice, a thermally conductive material, and a surface material. A lift system provides spacing when desired, such as installation and removal, of the upper panel. Some implementations can include a wireless charger.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
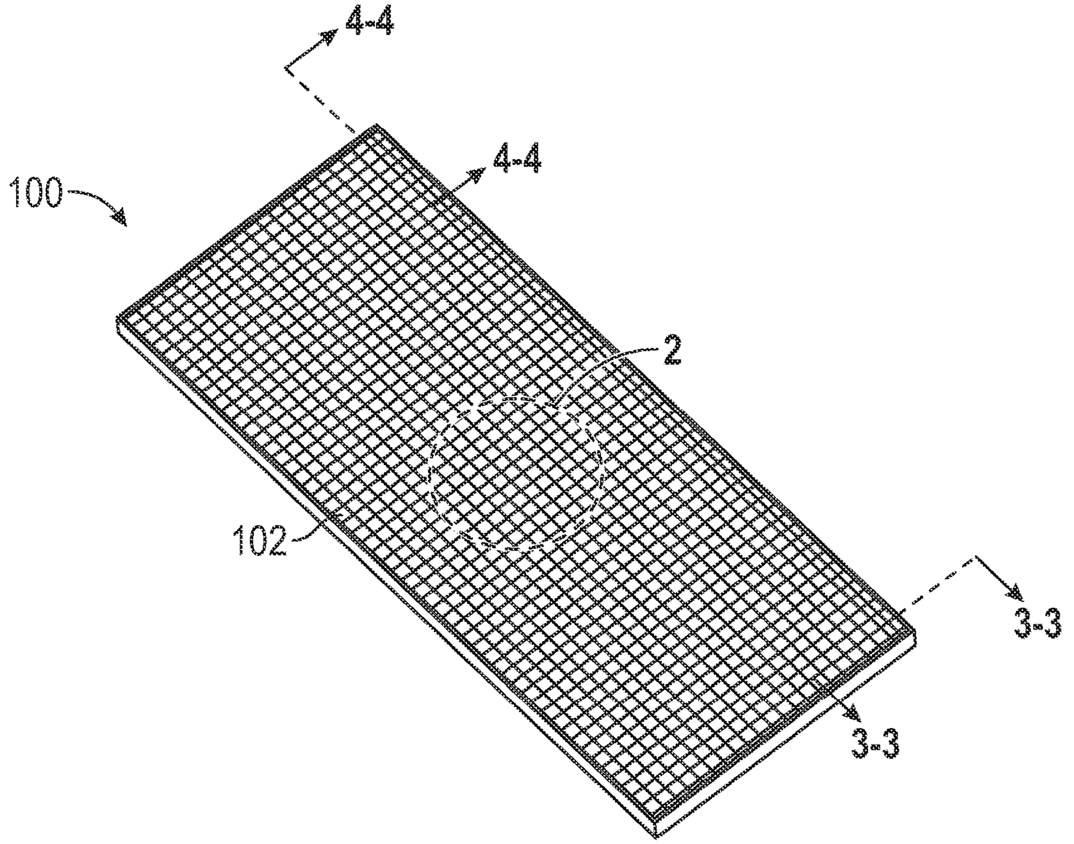
FIG. 1 shows a top perspective view of an exemplary melting panel, according to some aspects of the present disclosure.
Figure 2:
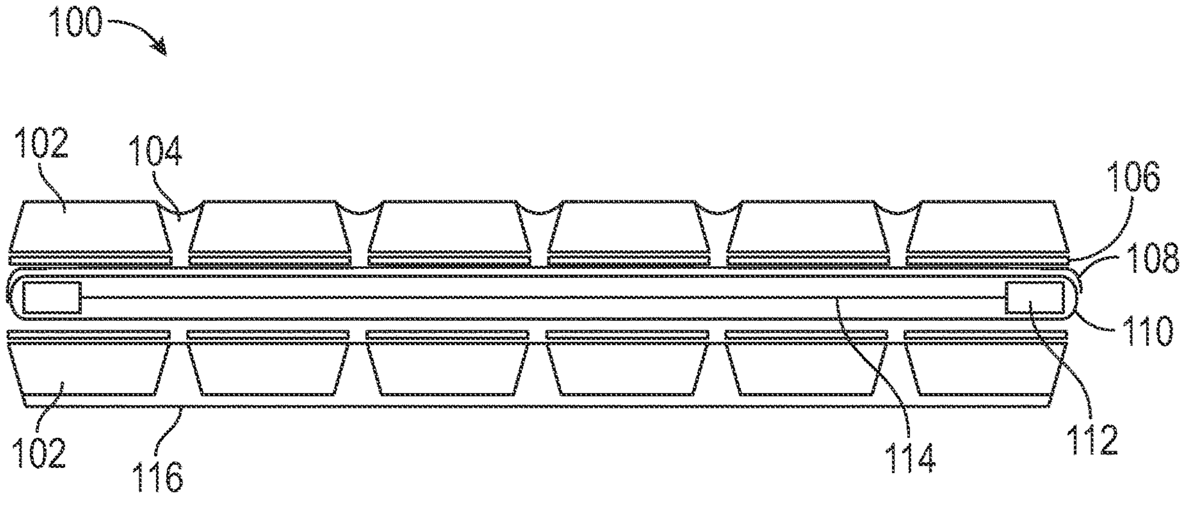
FIG. 2 shows a cross sectional, detailed view of twelve interior tiles of the melting panel of FIG. 1, said detailed view being referenced in FIG. 1 by the detail bubble 2.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

FIGS. 1-5 show exemplary melting panel(s) 100. The melting panel 100 can be used to, but is not limited to being use to, heat floors, walls, ceilings, and other such surfaces in both residential and commercial settings. The melting panel 100 is not required to actually melt an object, but rather garners its namesake because in some embodiments, the melting panel 100 can be employed to melt snow and/or ice to keep its upper surface substantially free from same.

The melting panel 100 includes individual tiles 102, an adhesive or structural material 104 to link the tiles to each other, a heating element 114 which serves as a function of the panels to generate heat, a grounding element 108, an electrical wire 112 to carry electricity from a power source through the heating element, a film or mesh material 110 for containing heating element 114 and electrical wire 112, an adhesive 106 to adhere a the tile 102 to the film or mesh material 110, and a base 116 that acts as the lower surface to the melting panel 100.

Figure 3:
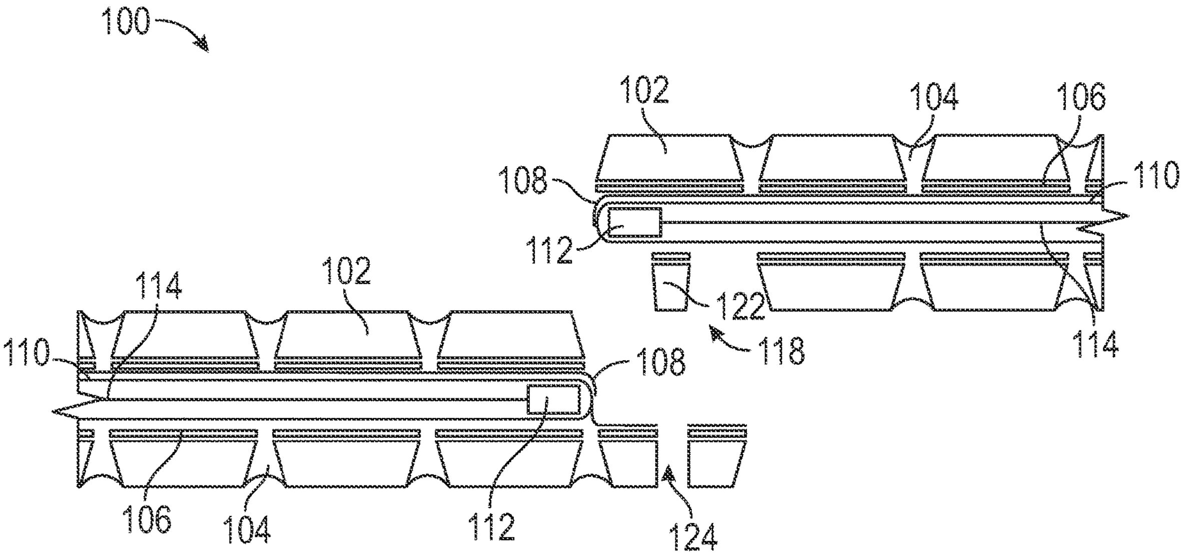
FIG. 3 shows a cross sectional, end view of the melting panel of FIG. 1 emphasizing how a mechanical connection amongst like melting panels can be established, said cross-sectional end view taken at line 3-3 of FIG. 1.
Figure 4:
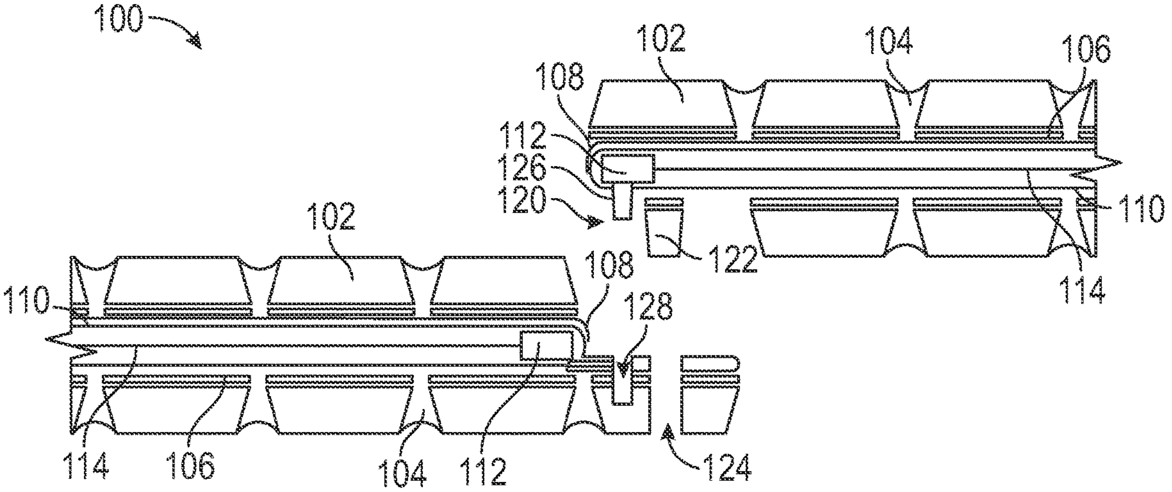
FIG. 4 shows a cross sectional, end view of the melting panel of FIG. 1 emphasizing how an electromechanical connection amongst like melting panels can be established, said cross-sectional end view taken at line 4-4 of FIG. 1.
Figure 5:
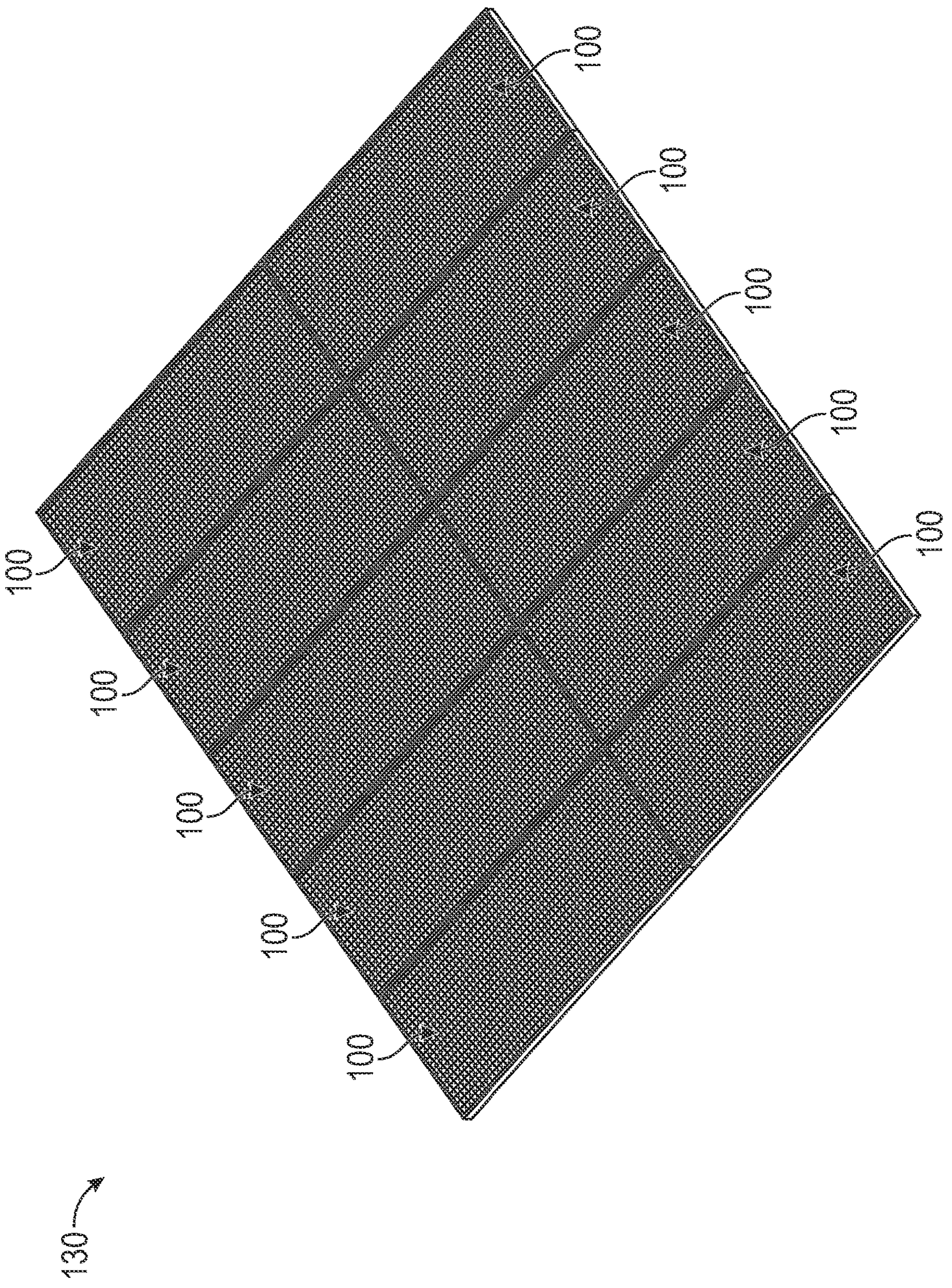
FIG. 5 shows an assembled view of melting panels secured to one another so as to form a larger surface area for melting.

FIG. 3 in particular emphasizes use of a mechanical connector 118, and FIG. 4 in particular emphasizes use of an electromechanical connector 120. Some implementations and/or assemblies 130 (see FIG. 5) can include mechanically and/or electrically connecting multiple panels 100 together.

The individual tiles 102 can comprise ceramic, vinyl, linoleum sheet goods, wood, aluminum, concretes (including polymeric concretes), cements, asphalt, natural stones (e.g., limestone, marble, etc.), plastics, fibers, resin, epoxy, synthetic materials emulating the functional characteristics of any of the preceding materials, or any combination thereof. While the tiles 102 are shown in substantially trapezoidal shapes, it is to be appreciated the tiles 102 can be shaped in any suitable manner. For example, the tiles 102 may include a larger lower surface than upper surface not only to maximize the amount of surface area in contact with the film or mesh material 110 which is heated by the heating element 114, but also to help support the weight of persons or large cargo placed thereon. As another example, the shape of the tile 102 may be specifically chosen to complement one or more structural materials 104 used within the melting panel 100.

The structural material 104 possesses elastic qualities that enable the complete panel to conform to the surfaces it rests on. The structural material 104 can comprise cement, grout, mortar, epoxy, resin, adhesive, rubber, glue, sand, plastic, synthetic materials emulating the functional characteristics of any of the preceding materials, or any combination thereof. In a preferred embodiment, the structural is a substantially solid medium comprising vulcanized rubber, an adhesive, and/or a flexible polymer.

In some embodiments, the adhesive 106 comprises a concrete, an epoxy, or a melted polyethylene terephthalate ("PET").

The film 110 is thin, and is preferably less than three millimeters (<3 mm). For example, the film 110 can be approximately 0.5 mm in thickness. The electrical wire 112 is flexible at the individual module level.

In some embodiments, the heating element 114 can comprise carbon-based conductive inks, nickel-chromium alloys, carbonized filament, copper nickel alloys.

The base 116 includes a lower, planar surface. The lower planar, surface and can be formed from a lower surface of lower row(s) of tiles 102 and/or a lower surface of the structural material 104. An adhesive can be applied to said lower surface of the base 116. The base 116 serves as a foundation upon which the weight of the melting panel 100, snow/ice, and/or other objects are placed upon. The base 116 can contact and/or gather support from the ground therebeneath or any other foundational surface.

The mechanical connection that relies on mechanical connector 118 generally relies on the use of a male mechanical member 122, such as a pin, tooth, or ridge, and a female mechanical member 124, such as a slot, groove, or channel. The female mechanical member 124 receives the male mechanical member 122 to form a mechanical interlock, thereby facilitating securement. In some configurations, a single heating panel 100 could include edges with only male mechanical members 122, edges with only female mechanical members 124, or a mix of the two. Generally speaking, the more potential panel configurations there are available to installers of said heating panels 100, the greater potential there is to meet application-specific requirements and/or to maximize surface areas of resulting assemblies 130.

Other suitable types of mechanical connectors and/or modules could also be employed in addition to those members previously mentioned or in lieu thereof. For example, more mechanically complex joints, mechanical connectors that include both male and female members at the same edge of a panel, and/or tracks/guides could be employed to facilitate securement amongst like melting panels 100.

Similar to the mechanical connectors 118, electromechanical electrical connectors 120 will include a male mechanical member 122 and female mechanical member 124. However, electromechanical connectors 120 also include a means for establishing an electrical connection, such as by way of a male electrical member 126 (e.g., a prong or plug) and a female electrical member 128 (e.g., an electrical socket, jack, or outlet).

It is to be appreciated that in some embodiments, the male mechanical member 122 can be received by panels that employ a female mechanical member 124, regardless of whether the female mechanical member 124 is included in a strictly mechanical connector 118 or whether the female mechanical member is included in an electromechanical connector 120. This benefit can help enhance potential assembly options as well.

Likewise, a male electrical connector 126 can be designed such that it can only be received by a female electrical connector 128 of an electrotechnical connector 120. This can help prevent an installer from forming an inoperable (e.g. cannot conduct electricity therethrough) combinations of the melting panels 100.

In some embodiments, additional screws, nuts, bolts, pins, rivets, staples, washers, grommets, latches (including pawls), ratchets, clamps, clasps, flanges, ties, adhesives, welds, magnets, any other known fastening mechanisms, or any combination thereof may be used to facilitate fastening.

Figure 6:
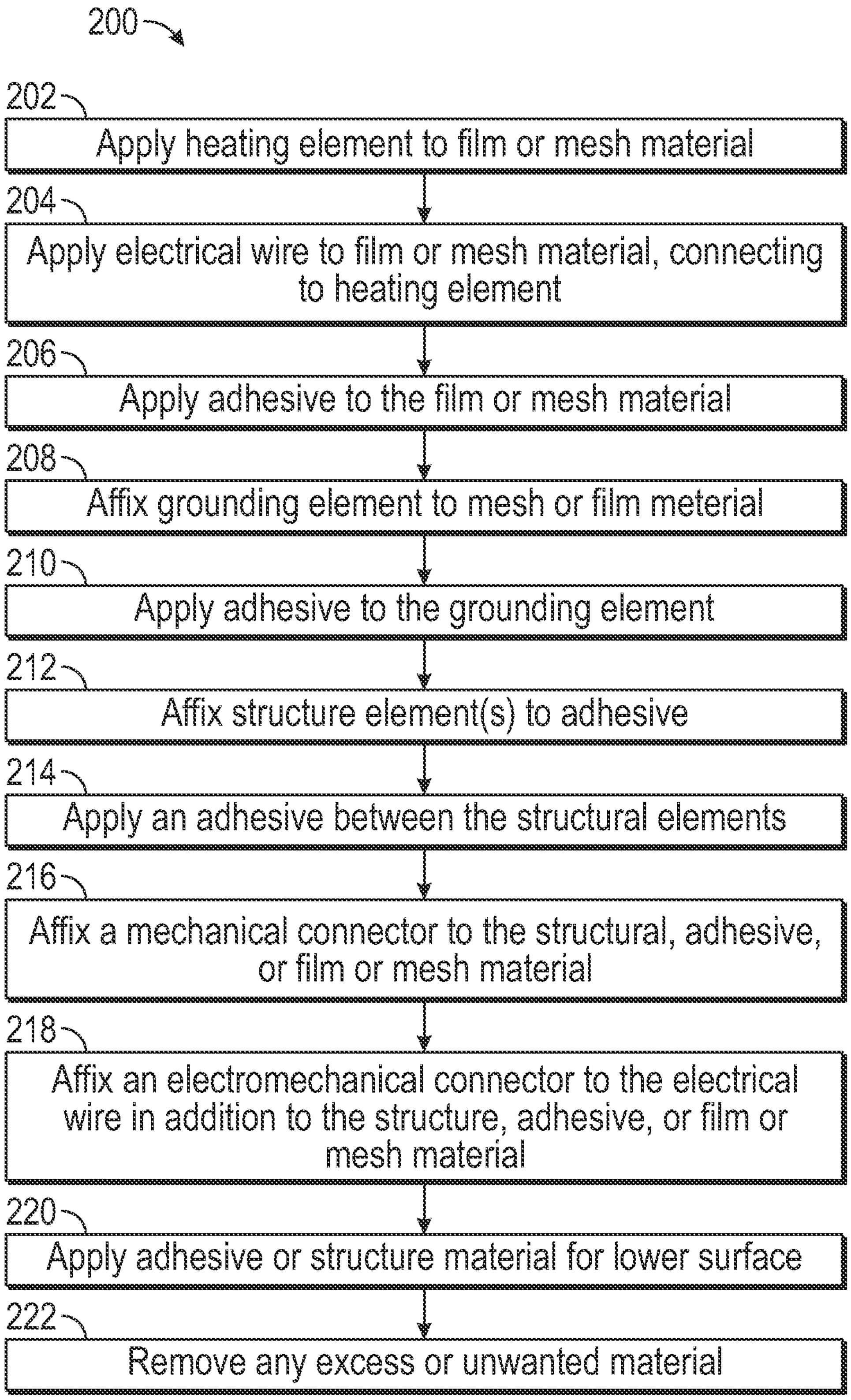
FIG. 6 illustrates an exemplary method of assembly for forming the melting panel of FIG. 1, according to some aspects of the present disclosure.

FIG. 6 is a flowchart depicting steps of method(s) for assembling a melting panel. No particular step in the method is required for any particular assembly unless so claimed.

One such exemplary method begins with step 202: a heating element 114 is applied to a film or mesh material 110. The method can continue with step 204: electrical wire 112 is applied to the film or mesh material 110 and electrically connected to the heating element 114. The method can continue with step 206: adhesive 106 is applied to the film or mesh material 110. The method continues with step 208: a grounding element 108 is affixed to the mesh or film material 110. The method can continue with step 210: an adhesive 106 is applied to the grounding element 108. The method can continue with step 212: a structural element 104 is affixed to the adhesive 106. The method can continue with step 214: an adhesive 106 is applied between the structural elements 104. The method can continue with step 216: a mechanical connector 118 is affixed to the structural material 104, adhesive 106, and/or film or mesh material 110. The method can continue with step 218: an electromechanical connector 120 is electrically connected to the electrical wire 112 in addition to the structural material 104, adhesive 106, and/or film or mesh material 110. The method can continue with step 220: an adhesive or structural material is applied for the lower surface. The method can continue with step 222: any excess or unwanted material is removed.

Method(s) for assembling multiple melting panels 100 together in a single assembly 130 can be characterized by one or more of the following steps: a melting panel 100 is placed at the desired location; a second assembled melting panel 100 is placed adjacent to the first melting panel 100; the two melting panels 100 are connected together using the mechanical connector 118; the two melting panels are connected together using the electrical connector 120; one or more of the panels 100 are secured to an external surface or object; the assembly procedure can be repeated with subsequent panels 100 as desired.

Figure 7:
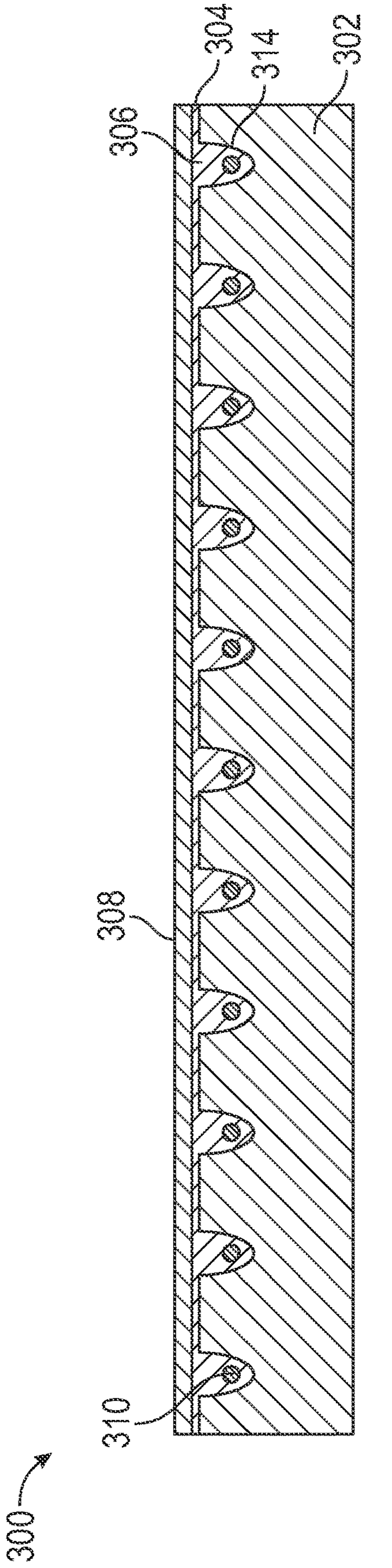
FIG. 7 shows a cross sectional, front view of a surface with an embedded heating element, according to some aspects of the present disclosure.
Figure 8:
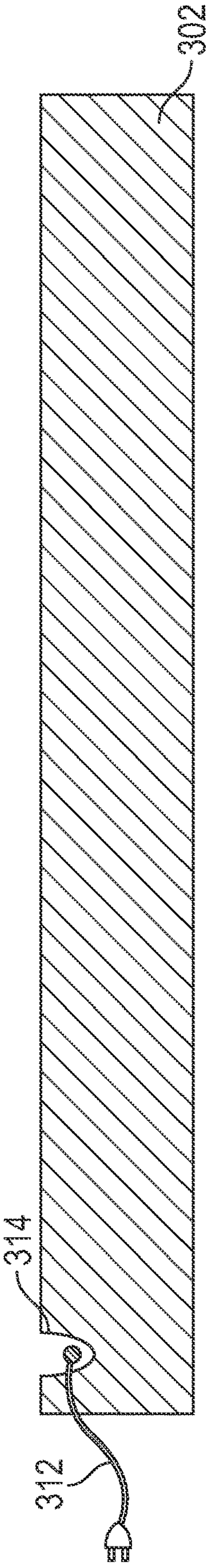
FIG. 8 shows another cross sectional, front view of the surface of FIG. 7, emphasizing the electrical connection to the slab.

FIGS. 7-8 show an example of a cross section of a surface with embedded heating elements installed 300. The three-dimensional surface 302 has reliefs 314 to house the heating elements 310. The reliefs 314 are generally half-moon shaped and in some embodiments approximate the curvature of the heating elements 310.

An insulating material 304 provides a thermal barrier to resist heat traveling to undesired depths. The insulating material 304 provides an electrical barrier as well. Heating elements 310 that can be made with resistance heating and provide the main function of warming the layers above. The insulating material 304 can comprise cement, grout, mortar, epoxy, resin, polyester, adhesive, ceramic, synthetic materials emulating the functional characteristics of any of the preceding materials, or any combination thereof. Beneficially, in some embodiments the insulating material 304 can provide an electrical barrier.

A thermally conductive material 306 acts as an adhesive and support for the heating elements 310 and a durable, structural layer 308 that is the aesthetic layer exposed to the elements. The thermally conductive material 306 can comprise cement, grout, mortar, epoxy, resin, including fiber infused variants, metal, graphite, graphene, synthetic materials emulating the functional characteristics of any of the preceding materials, or any combination thereof.

This final structural layer 308 can have specific design imprints, as well as specific texturing for traction, wear, or appearance. The durable, structural layer 308 can comprise ceramic, vinyl, linoleum sheet goods, wood, aluminum, concrete, asphalt, natural stones (e.g., limestone, marble, etc.), plastic, epoxy, metal, synthetic materials emulating the functional characteristics of any of the preceding materials, or any combination thereof.

The electrical connector 312 provides electricity to the system to function. The electrical connector can comprise electrical wires, plugs, sockets, and/or any other suitable means for establishing an electrical connection between the heating elements 310 and an external power source.

Figure 9:
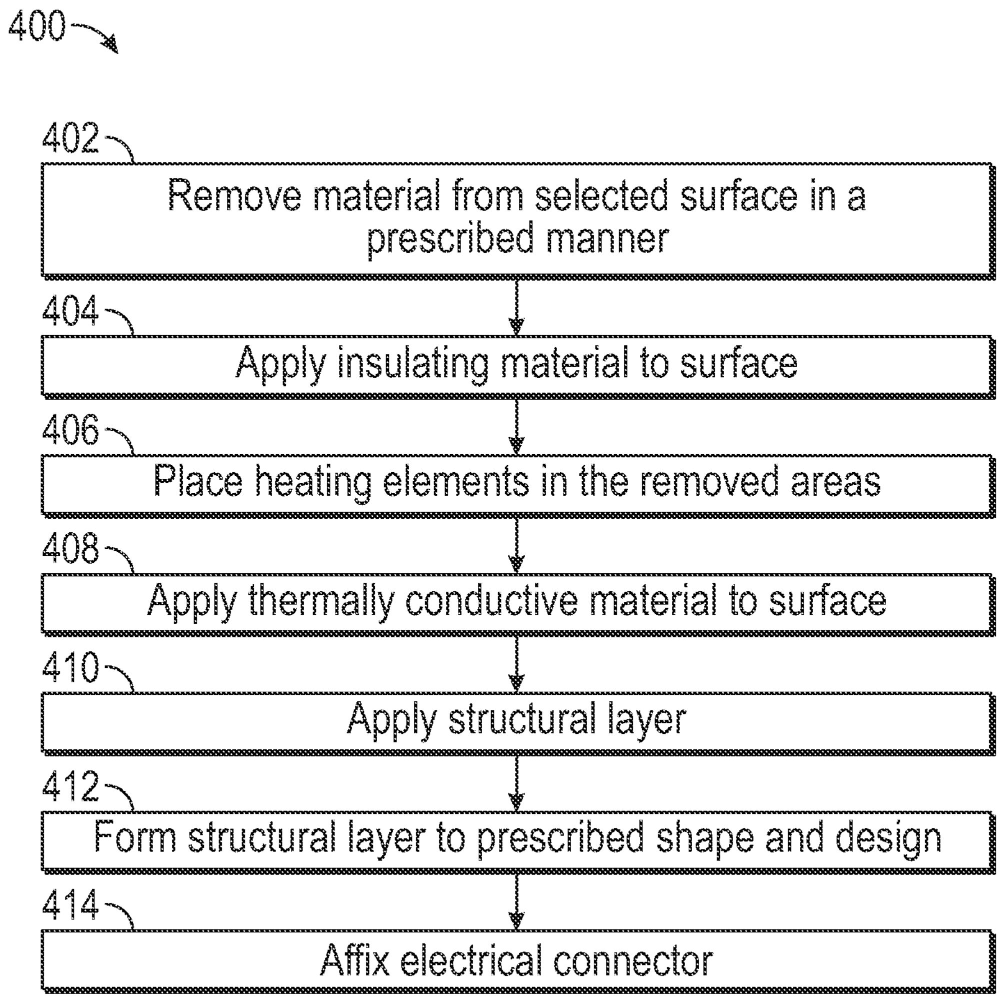
FIG. 9 illustrates an exemplary method for embedding heating elements within a surface, which can thereby result in the formation of a surface similar to the one shown in FIG. 7.
Figure 10:
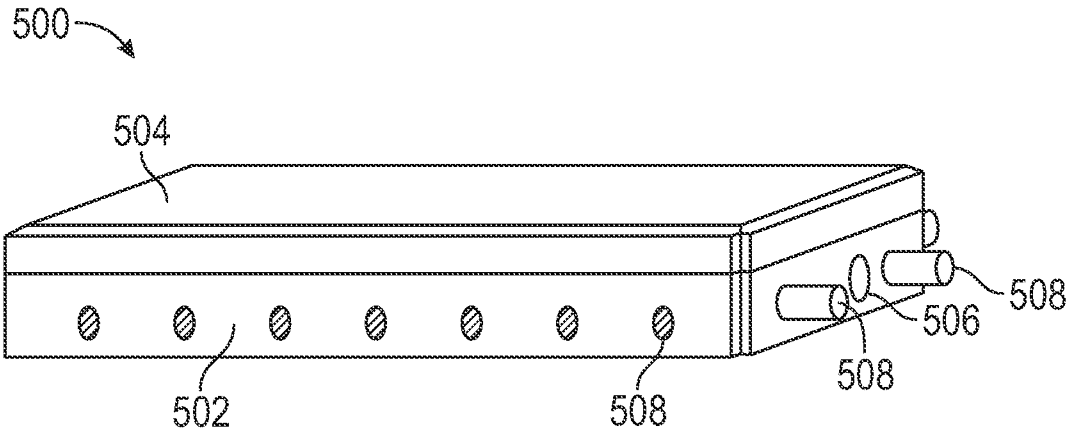
FIG. 10 shows a top perspective view of an exemplary highly integrated two-piece panel, according to some aspects of the present disclosure.
Figure 11:
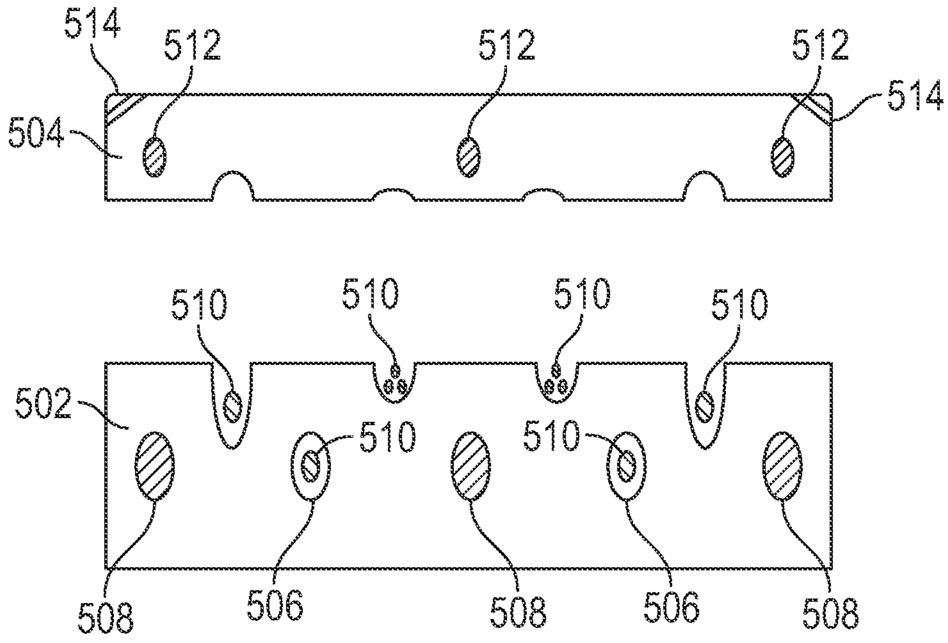
FIG. 11 shows an exploded, cross-sectional front view of the highly integrated two piece panel shown in FIG. 10.
Figure 12:
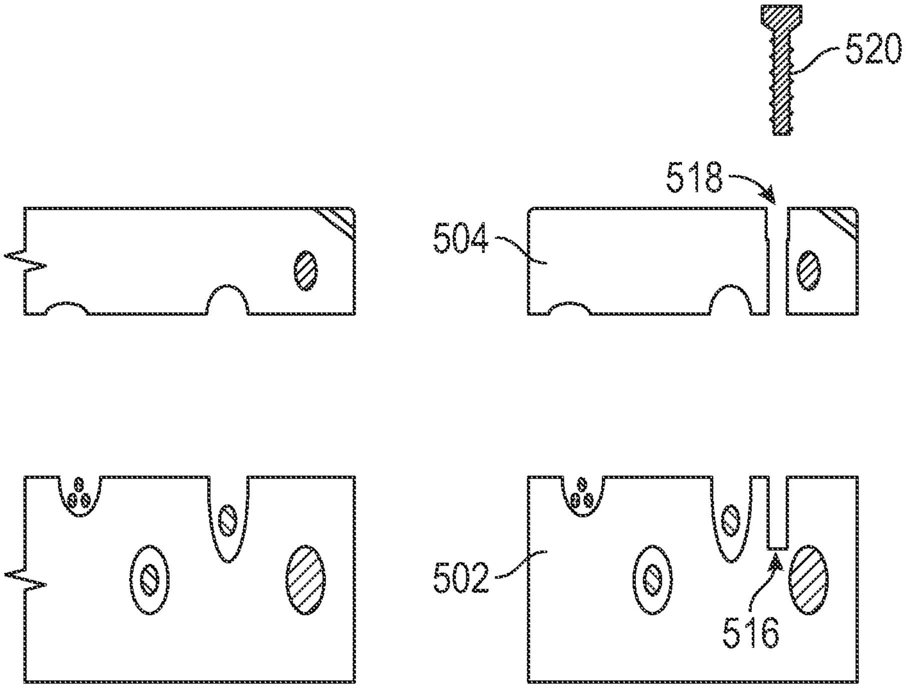
FIG. 12 shows an exploded, cross sectional side view of the highly integrated two piece panel shown in FIG. 10, emphasizing view of a mechanical connector.
Figure 13:
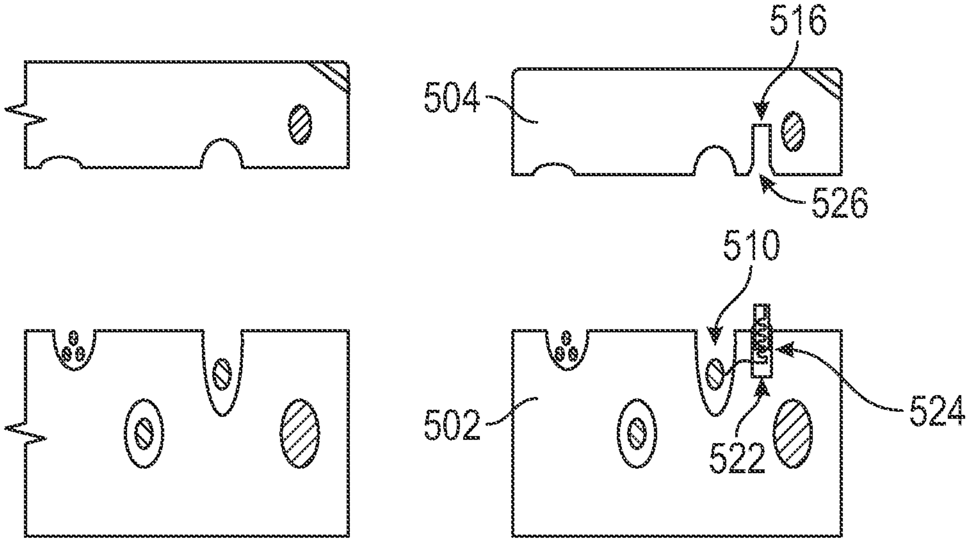
FIG. 13 shows an exploded, cross sectional side view of the highly integrated two piece panel shown in FIG. 10, emphasizing view of an electrical connector.
Figure 14:
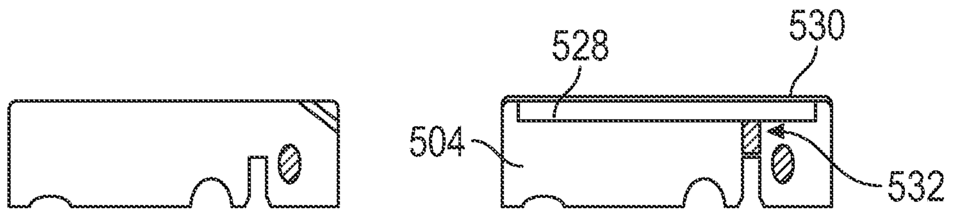
FIG. 14 shows an exploded, cross sectional side view of the highly integrated two piece panel shown in FIG. 10, emphasizing view of an electrical heating element of the upper panel.
Figure 15:
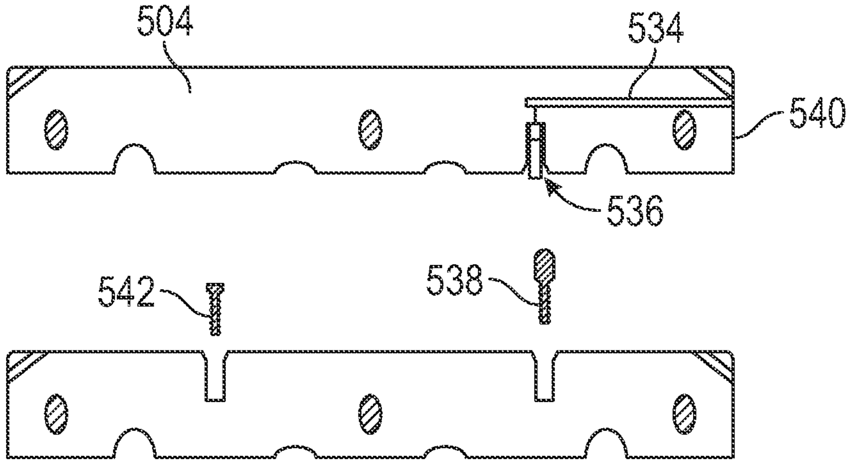
FIG. 15 shows an exploded, cross-sectional front view of the highly integrated two piece panel shown in FIG. 10, emphasizing view of a pneumatic or hydro-pneumatic or hydraulic lift system.
Figure 16:
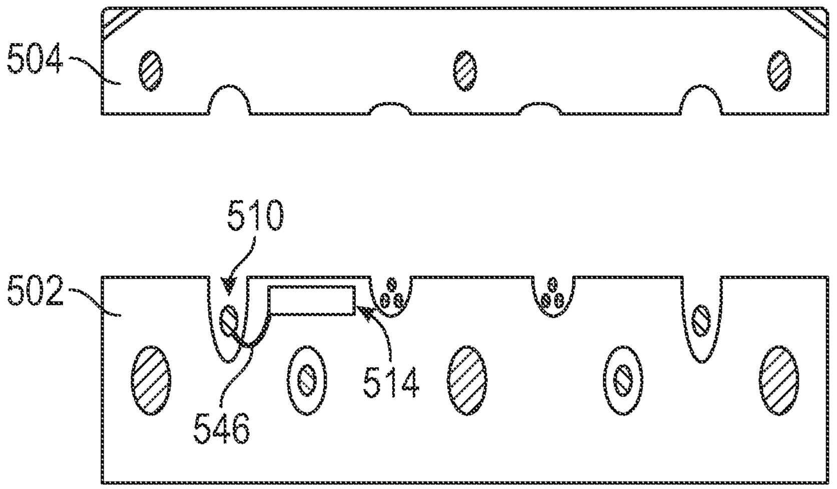
FIG. 16 shows an exploded, cross-sectional front view of the highly integrated two piece panel shown in FIG. 10, adapted to transmit wireless power.

FIG. 9 shows a flowchart depicting method(s) of assembling a surface with an embedded heating element 300 in accordance with some implementations. One such method begins with step 402: material is removed from the selected surface 302 in a prescribed manner to create removed areas/reliefs 314. The method can continue with step 404: insulating material 304 is applied to the exposed surface 302. The method can continue with step 406: heating elements 310 are placed in the previously removed areas 314. The method can continue with step 408: a thermally conductive material 306 is applied to the surface 302. The method can continue with step 410: a structural layer 308 is applied. The method can continue with step 412: the structural layer 308 is formed to a prescribed shape and design. The method can continue with step 414: an electrical connector 312 is affixed and/or otherwise electrically connected to the heating elements 310.

FIGS. 10-16 show a two-piece highly integrated panel 500, comprising of upper 504 and lower 502 main structures. Multiple panels can be connected together by means of load transfer devices 508. Additionally, a provision exists with the highly integrated panel for cables, wires 510, and other utilities to pass through openings 506.

Multiple panels may be connected together by means of load transfer devices 508 on the lower structure 502 and load transfer devices 512 on the upper structure 504. Additionally, a provision exists with the highly integrated panel for cables and other utilities to pass through openings 506. Water drainage channels 514 can be included.

The upper panel 502 may be secured to the lower panel 502 by a suitable an attachment 520 (shown as a screw) through openings 518 (shown as a thru-hole) and 516

(shown as a rectangular channel). Power in the form of electricity may be provided via the wires 510 passing through provision, transmitted via electrical connector 522, and further transmitted through a variable-distance contact 524. This contact would be in continual contact with receptor 516, housed in opening 526, thereby transmitting power from the lower panel 502 and wire 510 up to the upper panel 504.

An electric heating element 532 generates heat. A thermally conductive material 528 distributes the heat towards the surface and ultimately heating up the surface material 530. The surface material 130, being heated sufficiently to melt snow and or ice, enables for any accumulated snow or ice to be melted, and prevent further accumulation, so long as the system remains operational.

A pneumatic or hydro-pneumatic or hydraulic lift system 536 is designed to provide spacing when desired, such as installation and removal, of the upper panel 504. A high pressure fluid supply may supply a high pressure fluid to the fluid inlet valve 540, which when open, allows fluid to pass through the fluid pipe 534, activating the fluidly driven jack 536. Mechanical fasteners 538 and 542 can help facilitate fastening between the upper panel 504 and the lower panel 502.

In some embodiments, the fluid is air, and the fluidly driven jack 536 is a pneumatic air jack. In some other embodiments, the fluid can be a hydraulic fluid Wireless power, inductive or other, may be also integrated into the panel. A wireless charger 544 may be supplied power via a connector 546, which may be supplied power from the distribution line 510.

Figure 17:
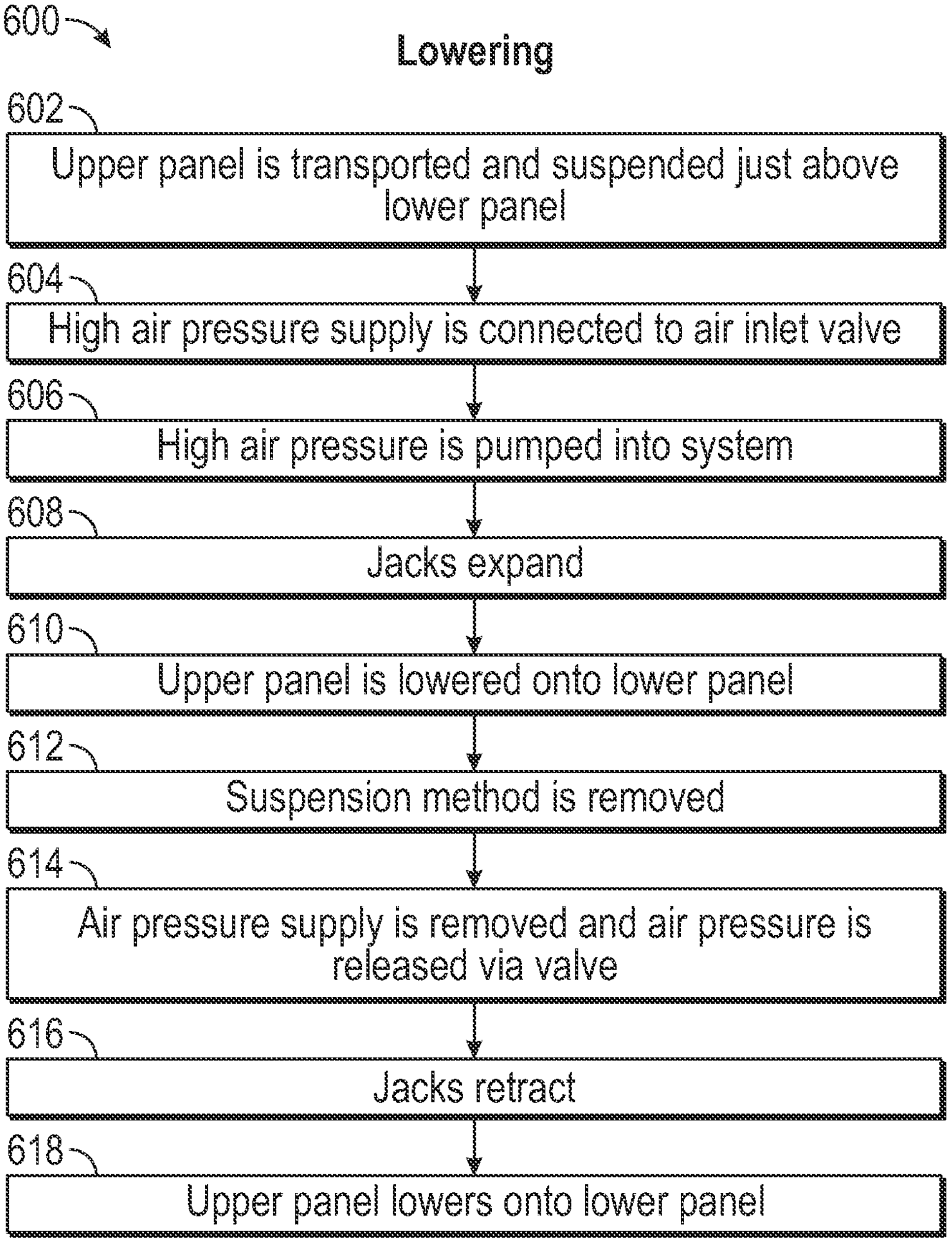
FIG. 17 illustrates an exemplary method for transporting, installing, raising, and removing highly integrated panels such as the one shown in FIG. 10, emphasizing steps for installing an upper surface onto a lower surface of in the highly integrated module.

FIG. 17 depicts a flowchart with method(s) 600 of transporting and installing highly integrated panels 500. The method can begin with step 602: the upper panel 504 is transported to the lower panel 502 and suspended above. The method can continue with step 604: a high air pressure supply is connected to the air inlet valve 540. The method can continue with step 606: high air pressure is pumped into system. The method can continue with step 608: the jacks 536 expand as a result of the high air pressure. The method can continue with step 610: the upper panel 504 is lowered onto the lower panel 502. The method can continue with step 612: the suspension method is removed. The method can continue with step 614: the air pressure supply is released and the valve 540 opened. The method can continue with step 616: the jacks 536 retract. The method can continue with step 618: the upper panel 504 lowers into the lower panel 504.

Figure 18:
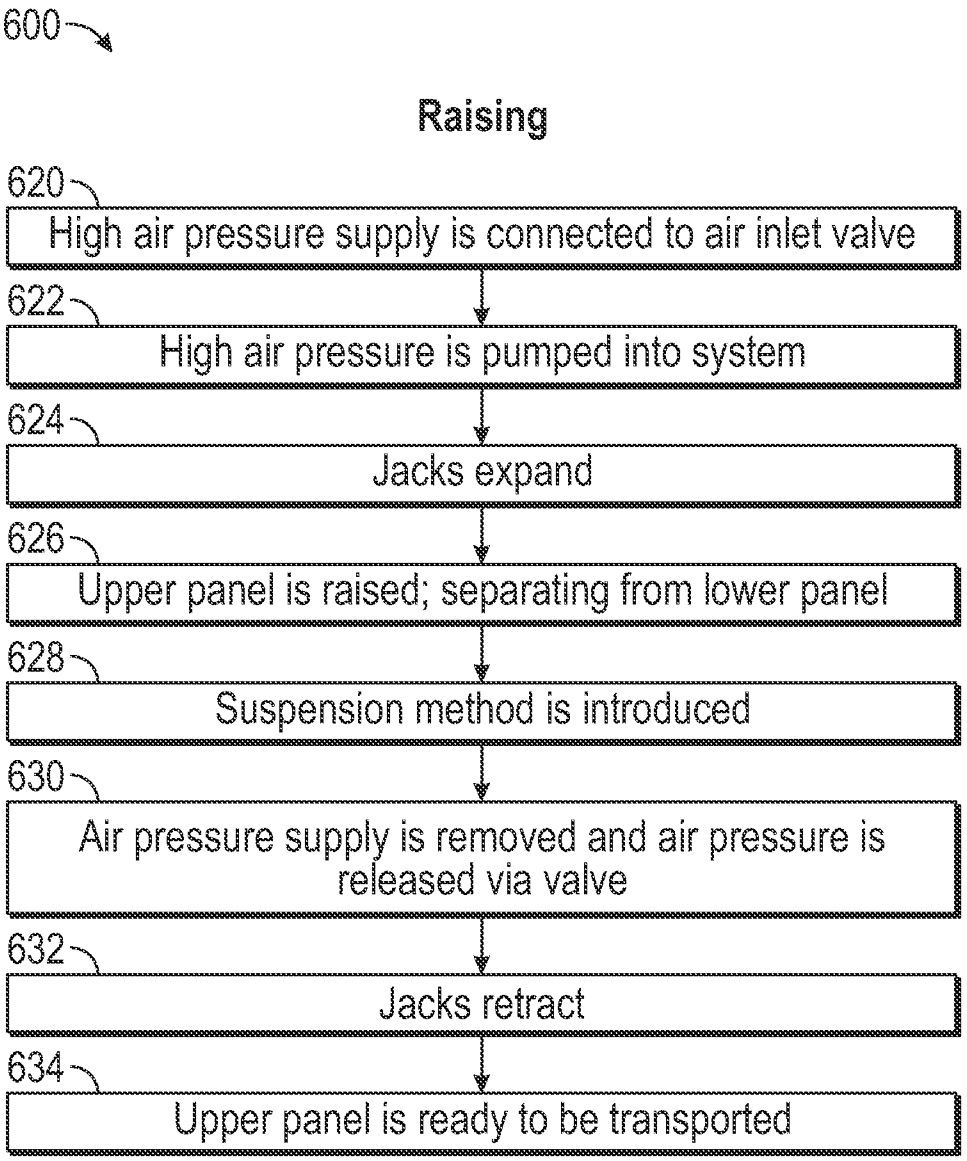
FIG. 18 illustrates an exemplary method for transporting, installing, raising, and removing highly integrated panels such as the one shown in FIG. 10, emphasizing steps for removing an upper surface from a lower surface in the highly integrated module.

FIG. 18 depicts a flowchart with method(s) 600 of raising and removing highly integrated panels according with some implementations. The method can begin with step 620, where high air pressure supply is connected to air inlet valve 540. The method can continue with step 622: high air pressure is pumped into the system. The method can continue with step 624: the jacks 536 expand. The method can continue with step 626: the upper panel 504 is raised, separating from the lower panel 502. The method can continue with step 628: a suspension method is introduced to hold the upper panel. The method can continue with step 630: the air pressure supply is removed and the air pressure is released via the valve. The method can continues with step 232: the jacks retract. The method can continue with step 634: the upper panel is ready to be transported.

It is to be appreciated similar method(s) to those described in the preceding paragraphs can be carried out wherein the use of a hydraulic fluid is used as the fluid instead of air.

It is, therefore, apparent that there is provided, in accordance with the various embodiments disclosed herein, a highly integrated panel, installing method of the upper, and removal method of the upper.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 100 | melting panel |
| 102 | tiles |
| 104 | structural material/substantially solid medium |
| 106 | adhesive |
| 108 | grounding element |
| 110 | film/mesh |
| 112 | electrical wire |
| 114 | heating element |
| 116 | base |
| 118 | mechanical connector |
| 120 | electromechanical connector |
| 122 | male mechanical member |
| 124 | female mechanical member |
| 126 | male electrical member |
| 128 | female electrical member |
| 130 | assembly of melting panels |
| 200 | method of assembly |
| 202-222 | steps of assembly |
| 300 | surface with embedded heating elements installed |
| 302 | slab/three-dimensional surface |
| 304 | insulating material |
| 306 | thermally conductive material |
| 308 | structural layer |
| 310 | heating elements |
| 312 | electrical connector |
| 314 | reliefs (e.g., grooves, channels, etc.) |
| 400 | method of assembly |
| 402-414 | steps of assembly |
| 500 | two-piece highly integrated panel |
| 502 | lower structure |
| 504 | upper structure |
| 506 | openings |
| 508 | load transfer devices |
| 510 | wire |
| 512 | load transfer devices |
| 514 | water drainage channel |
| 516 | opening |
| 518 | opening |
| 520 | fastener |
| 522 | opening |
| 524 | variable distance contact |
| 526 | opening |
| 528 | thermally conductive material |
| 530 | heated surface material |
| 532 | electric heating element |
| 534 | fluid pipe |
| 536 | fluid jack |
| 538 | fastener |
| 540 | inlet valve |

TABLE 1-continued

| List of Reference Characters | |
|---|---|
| 542 | fastener |
| 544 | wireless charger |
| 546 | connector |
| 600 | method(s) of manipulating highly integrated panels |
| 602-634 | steps of method 600 |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The term "slab" as used herein is a two-dimensional surface having a three-dimensional depth thereto. For example, a slab can be, but is not limited to being, a large, thick, flat piece of stone, concrete, or wood, with definite or indefinite dimensions.

The term "thermally conductive" as used herein is used in connection with resins and other thermally conductive materials. Many resins and even typical concretes have a thermal conductivity<1.0 W/mK or at most<2.0 W/mK. Many thermally conductive materials will thus be at or above that value of 2.0 W/mK. Targets for thermally conductive materials are preferably within the range: 20-100 W/mK, and even more preferably are within the range: 100-500 W/mK. For example, aluminum oxide generally has a thermal conductivity of around 30 W/mK, steel has a thermal conductivity of around 20 W/mK, magnesium has a thermal conductivity of around 120-500 W/mK, copper has a thermal conductivity of around 100-900 W/mK, and graphite has a thermal conductivity of around 168 W/mK.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A melting panel comprising:

an assembly of heated tiles comprising:

said heated tiles at least partially encased in a substantially solid medium;

a film or a mesh material comprising a heating element and an electrical connection to an electrical wire;

an adhesive adhering to (i) a structural portion of the tile and (ii) the film or the mesh material;

a grounding element;

a base with a lower, planar surface, said base being formed from (i) at least some of the heated tiles or (ii) a lower portion of the substantially solid medium;

at least one mechanical connector located at a first edge of said melting panel;

an electromechanical connector located at a second edge of said melting panel, said electromechanical connector capable of delivering electricity to said electrical wire.

2. The melting panel of claim 1, wherein said first edge and said second edge are perpendicular to one another.

3. The melting panel of claim 1, wherein the heated tiles comprise upper and lower rows that sandwich said film or said mesh material, said heating element, and said adhesive.

4. The melting panel of claim 3, wherein said adhesive is applied to an upper surface of said film or said mesh material and a lower surface of said film or said mesh material.

5. The melting panel of claim 1, wherein the tiles comprise a material selected from the group consisting of: a polymeric concrete, a plastic, a concrete, a cement, and a metal.

6. The melting panel of claim 1, wherein the substantially solid medium comprises a material selected from the group consisting of: a vulcanized rubber, an adhesive, and a flexible polymer.

7. The melting panel of claim 1, wherein the heating element is selected from the group consisting of: a carbon-based conductive ink, Nickel-Chromium (Ni—Cr) Alloy, a carbonized filament, and a Copper-Nickel (Cu—Ni) Alloy.

8. The melting panel of claim 1, wherein the adhesive is selected from the group consisting of: a concrete, an epoxy, and a melted polyethylene terephthalate (PET).

9. A method of installing an embedded heating system having a slab with grooves, channels, and/or reliefs that enable placement of a plurality of heating elements; an insulating material capable of filling remaining space not taken up by the plurality of heating elements within said grooves, channels, and/or reliefs; a thermally conductive material thinly layered over the slab and the insulating material, said thermally conductive material having an upper planar surface; a structural element whose lower surface approximates the upper planar surface of the thermally conductive material and whose exposed surface includes aesthetic marks and/or shapes to differentiate a look of the exposed surface from the lower surface of the structural element; and an electrical connector electrically connected to said plurality of heating elements, the method comprising:

removing material from the slab to form the grooves, channels, and/or reliefs;

applying the insulating material to an upper surface of the slab;

placing heating elements in the grooves, channels, and/or reliefs;

laying a durable, structural layer on top of the upper surface of the slab and the thermally conductive material;

forming the durable, structural layer to a prescribed design; and affixing the electrical connector such that an electrical connection is established among the plurality of heating elements and external power source.

10. A multipurpose panel comprising:

an upper panel comprising:

an electric heating element that generates heat which can be used to melt snow and ice;

a thermally conductive material that distributes the heat towards the surface and ultimately heating up the surface material;

a surface material heated sufficiently to melt snow and or ice;

a pneumatic, hydro-pneumatic, or hydraulic lift system to provide spacing when desired, such as installation and removal, of the upper panel; and an inlet valve, which when open, allows air to pass through an air pipe;

a lower panel mechanically and electrically attached to the upper panel, said lower panel comprising:

openings for cables and other utilities to pass through; and water drainage channels.

11. The multi-purpose panel of claim 10 further comprising a first load transfer device located on the upper panel and a second load transfer device on the lower panel.

12. The multi-purpose panel of claim 11 further comprising a variable-distance receptor on one of the panels and a variable-distance contact on the other.

13. The multi-purpose panel of claim 10 further comprising a first electrical connector on the upper panel and a second electrical connector on the lower panel, wherein first electrical connector is electrically attached to the second electrical connector.

14. The multi-purpose panel of claim 10 wherein the lower panel further comprises a source of wireless power.

15. The multi-purpose panel of claim 14 wherein the wireless power is inductive.

16. The multi-purpose panel of claim 10 further comprising wires connecting the upper panel and the lower panel.

17. A method of raising and removing the multipurpose panel of claim 10 comprising:

transporting the upper panel to the lower panel and suspending the upper panel above the lower panel;

connecting a high pressure air supply to the air inlet valve;

pumping high pressure air into the system;

lowering the upper panel onto the lower panel; and removing the suspension method.

18. The method of claim 17 further comprising:

expanding the jacks;

removing the high air pressure supply and releasing the air by opening the air inlet valve; and retracting the jacks.

19. A method of transporting and installing the multipurpose panel of claim 10 comprising:

connecting high air pressure supply to air inlet valve;

pumping high air pressure into the system;

expanding the jacks;

raising the upper panel, thereby separating it from the lower panel;

introducing a suspension method to the upper panel;

removing the air pressure supply and releasing the high air pressure by opening the valve;

retracting the jacks; and transporting the upper panel.

* * * * *